US012368877B2

(12) United States Patent
Xiu et al.

(10) Patent No.: US 12,368,877 B2
(45) Date of Patent: Jul. 22, 2025

(54) ENHANCED MOTION ESTIMATION FOR INTER CODING

(71) Applicant: BEIJING DAJIA INTERNET INFORMATION TECHNOLOGY CO., LTD., Beijing (CN)

(72) Inventors: Xiaoyu Xiu, San Diego, CA (US); Che-Wei Kuo, Beijing (CN); Wei Chen, San Diego, CA (US); Yi-Wen Chen, San Diego, CA (US); Hong-Jheng Jhu, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 109 days.

(21) Appl. No.: 18/135,112

(22) Filed: Apr. 14, 2023

(65) Prior Publication Data

US 2023/0254501 A1 Aug. 10, 2023

Related U.S. Application Data

(63) Continuation of application No. PCT/US2021/055291, filed on Oct. 15, 2021.

(60) Provisional application No. 63/092,469, filed on Oct. 15, 2020.

(51) Int. Cl.
*H04N 19/513* (2014.01)
*H04N 19/176* (2014.01)

(52) U.S. Cl.
CPC ......... *H04N 19/513* (2014.11); *H04N 19/176* (2014.11)

(58) Field of Classification Search
None
See application file for complete search history.

(56) References Cited

U.S. PATENT DOCUMENTS

2018/0184115 A1\* 6/2018 Knee .................. H04N 19/56
2018/0316929 A1 11/2018 Li et al.
(Continued)

FOREIGN PATENT DOCUMENTS

WO 2020163319 A1 8/2020

OTHER PUBLICATIONS

Liu et al., "Adaptive Motion Vector Resolution for Affine-Inter Mode Coding", Nov. 12, 2019, 2019 Picture Coding Symposium (PCS), IEEE, pp. 1-4. (Year: 2019).\*
(Continued)

*Primary Examiner* — James M Anderson, II
(74) *Attorney, Agent, or Firm* — Arch & Lake LLP; Hao Tan; Shen Wang

(57) ABSTRACT

Methods, apparatuses, and non-transitory computer-readable storage mediums are provided for encoding video. An encoder may obtain a first motion vector (MV) associated with a video block obtained from the video. The encoder may obtain a first prediction signal of the video block using the first MV. The encoder may identify a target MV by applying a gradient-based motion refinement algorithm in a recursive manner using the first prediction signal and the first MV. The encoder may obtain a second prediction signal of the video block based on the target MV.

13 Claims, 9 Drawing Sheets

☐ 510
■ 520
● 530

(56) References Cited

U.S. PATENT DOCUMENTS

2020/0169748 A1   5/2020  Chen et al.
2020/0228815 A1   7/2020  Xu et al.

OTHER PUBLICATIONS

Hongbin Liu et al.; "Adaptive Motion Vector Resolution for Affine-Inter Mode Coding";2019 Picture Coding Symposium(PCS) Nov. 12-15, 2019, Ningbo, China.(4P).

Kan Xie et al.; "A new block-based motion estimation algorithm"; University of Leuven,ESAT-MI2,Kardinaal Mercierlaan 94,B-3001 Heverlee,Belgium;Signal Processing:Image Communication 4(1992)507-517 Elsevier.(11P).

Mohammed Ebrahim Al-Mualla et al.; "Video Coding for Mobile Communications Efficiency, Complexity, and Resilience";Academic Press;(316P).

Extended European search report of EP application No. 21881229.5 issued on Feb. 20, 2024.

International Search Report of PCT Application No. PCT/US2021/055291 dated Feb. 7, 2022, (2p).

* cited by examiner

■ 510
■ 520
● 530

■ 540
● 550

ENHANCED MOTION ESTIMATION FOR INTER CODING

CROSS-REFERENCE TO RELATED APPLICATION

This application is a continuation application of PCT application No. PCT/US2021/055291 filed on Oct. 15, 2021, which is based upon and claims priority to U.S. Provisional Applications No. 63/092,469 filed on Oct. 15, 2020, the entire contents thereof are incorporated herein by reference for all purposes.

TECHNICAL FIELD

This disclosure is related to video coding and compression. More specifically, this disclosure relates to systems and methods on improving enhanced motion estimation for inter prediction.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Examples of the present disclosure provide methods and apparatus for video encoding.

According to a first aspect of the present disclosure, a method for video encoding is provided. The method may include an encoder obtaining a first motion vector (MV) associated with a video block obtained from the video. The encoder may further derive a first prediction signal of the video block using the first MV. The encoder may further identify a target MV by applying a gradient-based motion refinement algorithm in a recursive manner using the first prediction signal and the first MV. The encoder may further obtain a second prediction signal of the video block based on the target MV.

According to a second aspect of the present disclosure, a method for encoding a video block in a video bitstream. The method may include an encoder maintaining a control point motion vector (CPMV) library at the encoder. The CPMV library may include one or more sets of CPMVs that are determined for different reference pictures in reference lists of previously coded video blocks. The encoder may further determine a target CPMV for each reference picture of the video block using the CPMV library. The encoder may further update the CPMV library by including a set of target CPMVs of the video block. Each CPMV may correspond to a reference picture of the video block and is used to replace one or more existing CPMV sets in the MV library.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
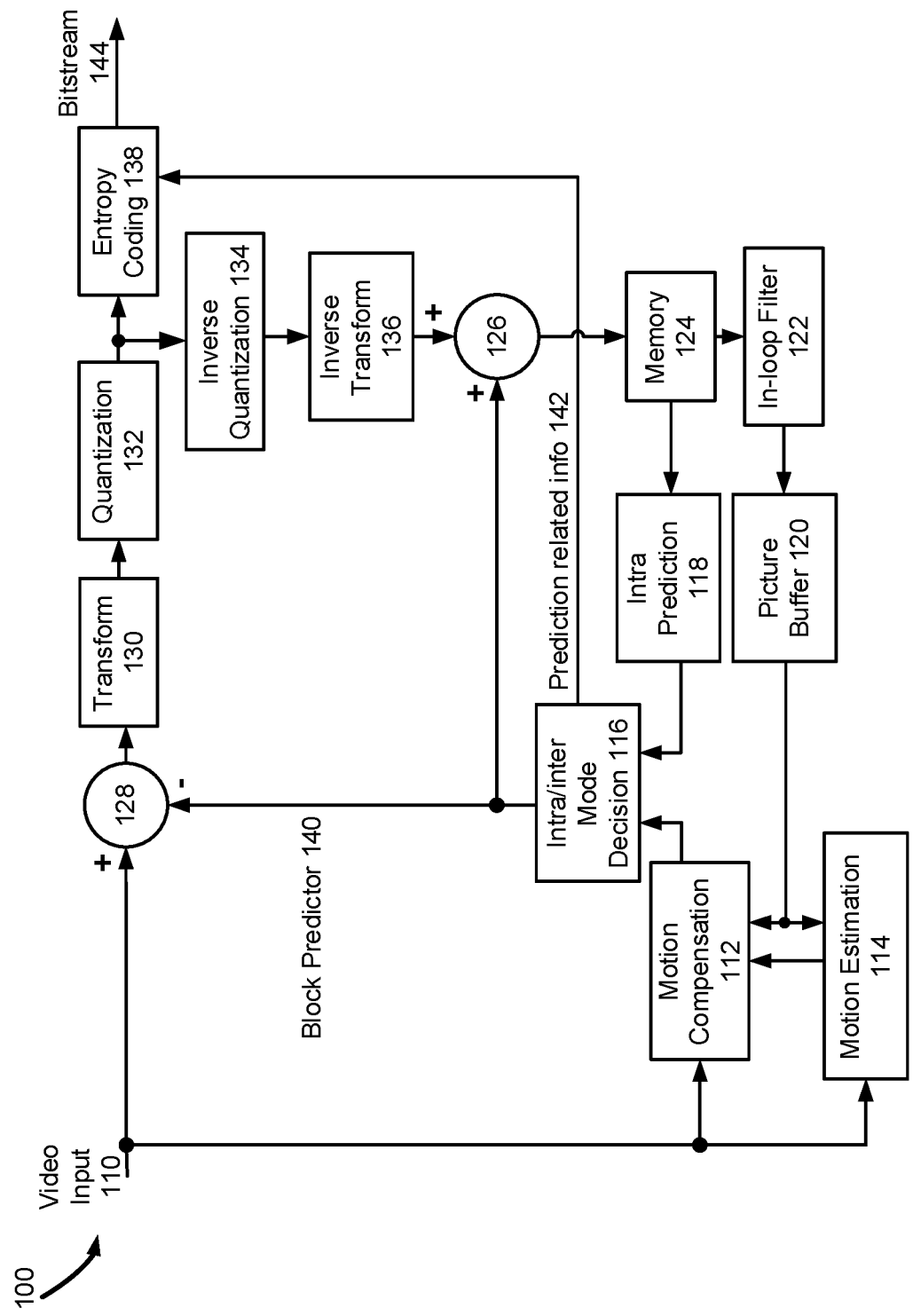
FIG. 1 is a block diagram of an encoder, according to an example of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc., may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements over its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the WET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th WET meeting, which demonstrated compression efficiency gain over the HEVC around 40%. Based on such evaluation results, the WET launched a new project to develop the new generation video coding standard that is named as Versatile Video Coding (VVC). In the same month, one reference software codebase, called VVC test model (VTM), was established for demonstrating a reference implementation of the VVC standard.

Like HEVC, the VVC is built upon the block-based hybrid video coding framework.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage, the temporal prediction signal comes from. In some examples, the CU may include one or more coding blocks. For example, the CU may include three coding blocks, which may be a luma coding block and two chroma coding blocks, and the coding block may further be divided into sub-blocks. Further, the coding methods according to the present application which are performed in a case of a CU herein may also be performed in a case of a block or a video block, where the block or video block herein may refer to a coding block or a sub-block.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

FIG. 1 gives the block diagram of a generic block-based hybrid video encoding system. The input video signal is processed block by block (called coding units (CUs)). In VTM-1.0, the size of a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. Additionally, the concept of multiple partition unit types in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure. As shown in FIGS. 3A, 3B, 3C, 3D, and 3E, there are five splitting types, quaternary partitioning, horizontal binary partitioning, vertical binary partitioning, horizontal ternary partitioning, and vertical ternary partitioning.

Figures 3A, 3B, 3C:
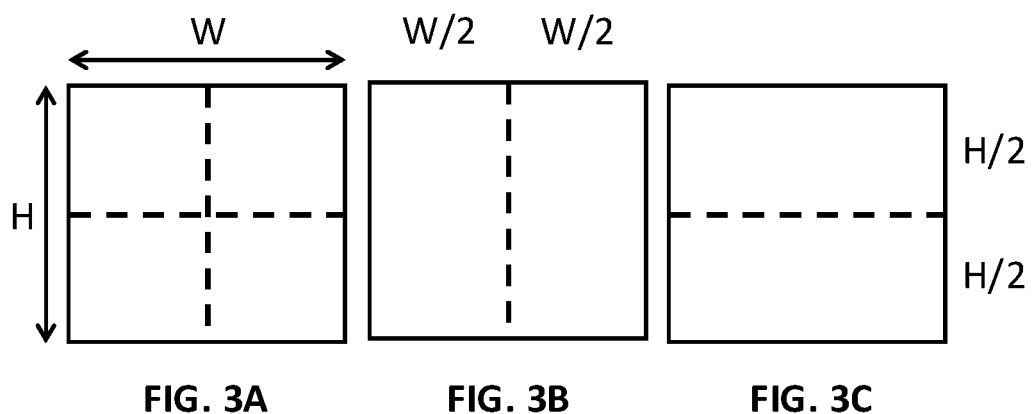
FIG. 3A is a diagram illustrating block partitions in a multi-type tree structure, according to an example of the present disclosure.
FIG. 3B is a diagram illustrating block partitions in a multi-type tree structure, according to an example of the present disclosure.
FIG. 3C is a diagram illustrating block partitions in a multi-type tree structure, according to an example of the present disclosure.
Figures 3D, 3E:
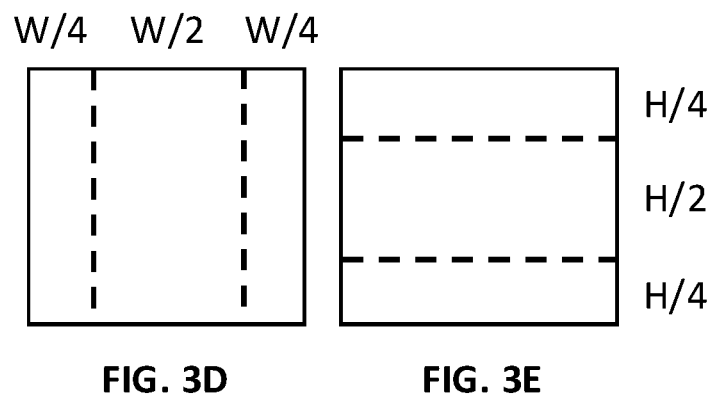
FIG. 3D is a diagram illustrating block partitions in a multi-type tree structure, according to an example of the present disclosure.
FIG. 3E is a diagram illustrating block partitions in a multi-type tree structure, according to an example of the present disclosure.

FIG. 3A shows a diagram illustrating block quaternary partition in a multi-type tree structure. FIG. 3B shows a diagram illustrating block vertical binary partition in a multi-type tree structure. FIG. 3C shows a diagram illustrating block horizontal binary partition in a multi-type tree structure, in accordance with the present disclosure. FIG. 3D shows a diagram illustrating block vertical ternary partition in a multi-type tree structure. FIG. 3E shows a diagram illustrating block horizontal ternary partition in a multi-type tree structure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the other already coded pictures to predict the current video block. Temporal prediction reduces temporal redundancy inherent in the video signal. Temporal prediction signal for a given CU is usually signaled by one or more motion vectors (MVs) which indicate the magnitude and the direction of motion between the current CU and its temporal reference block. Also, if multiple reference pictures are supported, one reference picture index is additionally sent, which is used to identify from which reference picture in the reference picture store the temporal prediction signal comes. After spatial and/or temporal prediction, the mode decision module in the encoder chooses the best prediction mode, for example based on the rate-distortion optimization method. A prediction block may be obtained based on the selected best prediction mode. The prediction block is then subtracted from the current video block; and the prediction residual is de-correlated using transform and quantization. The quantized residual coefficients are inverse-quantized and inverse-transformed to form the reconstructed residual, which is then added back to the prediction block to form the reconstructed signal of the CU. Further, in-loop filtering, such as deblocking filter, sample adaptive offset (SAO) and adaptive in-loop filter (ALF), may be applied on the reconstructed CU before it is put in the reference picture store and used to predict future video blocks. To form the output video bitstream, coding mode (inter or intra), prediction mode information, motion information, and quantized residual coefficients are all sent to the entropy coding unit to be further compressed and packed to form the bitstream.

Figure 2:
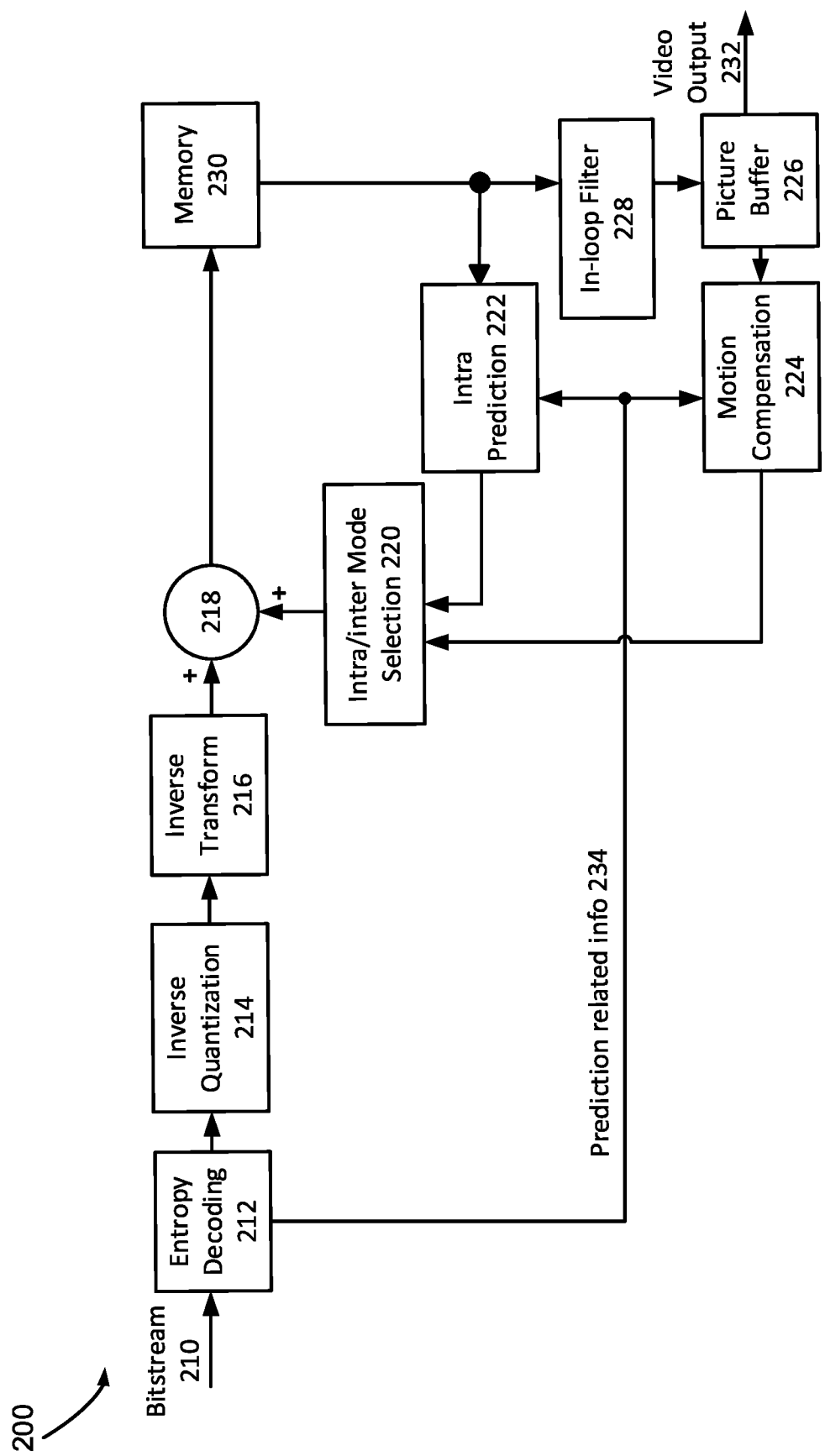
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232. Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bitstream is first entropy decoded at entropy decoding unit. The coding mode and prediction information are sent to either the spatial prediction unit (if intra coded) or the temporal prediction unit (if inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

As described above, the VVC standard adheres to the same encoding/decoding workflow of the hybrid video coding framework as shown in FIG. 1 and FIGS. 3A-3E. However, compared to the preceding standards (e.g., the H.265/HEVC and the H.264/AVC), several coding modules, especially the ones associated with inter prediction, are further extended and enhanced. The focus of the disclosure is to improve the encoder-side motion estimation methods that are used to derive the target (e.g., optimal) motion parameters for inter prediction. In the following, at first, we briefly review the inter coding tools technologies that are included in the VVC and closely related to the proposed encoder methods.

Regular Inter Mode

In general, for regular inter blocks, the motion information signaling in the VVC is kept the same as that in the HEVC standard. Specifically, one inter prediction syntax, i.e., inter_pred_idc, is firstly signaled to indicate whether the prediction signal from list L0, L1 or both. Then, for each used reference list, the corresponding reference picture is identified by signaling one reference picture index ref_idx_lx (x=0, 1) for the corresponding reference list, and the corresponding MV is represented by one MVP index mvp_lx_flag (x=0, 1) which is used to select the MV predictor (MVP), followed by its motion vector difference (MVD) between the target MV and the selected MVP.

Motion Estimation for Regular Inter Mode

In order to derive the MV of one inter block, block-matching based motion estimation method is used at the VTM encoder. Like the HEVC standard, the finest MV resolution supported in MVD signaling in the VVC is quarter-pel. To generate the reference samples at fractional positions, interpolation filters are applied to interpolate the fractional samples from their neighboring reference samples at integer positions. Additionally, instead of searching all the MV candidates at quarter-pel resolution, multiple stage motion estimation method is applied in the VTM to derive the target (e.g., optimal) MV. Specifically, the test zone (TZ) algorithm is applied for integer motion estimation to find the best MV at integer-pel accuracy. Then, one half-pel motion search process and one quarter-pel motion search process are applied sequentially. The half-pel motion search process examines the 8 half-pel neighboring sample positions around the best integer-pel MV, and the quarter-pel motion search process examines the 8 quarter-pel neighboring sample positions around the best half-pel precision MV. The best integer-pel/half-pel precision MV are determined to be the MV which achieves the minimum rate-distortion (R-D) cost during the search process. After quarter-pel motion search, the final MV that minimizes the R-D cost is selected as the MV of the block. To calculate the R-D cost, sum of absolute difference (SAD) is used for integer-pel motion search and sum of absolute transformed difference (SATD) is used for half-pel and quarter-pel motion search. The rate is calculated as the number of bins that are generated to represent the corresponding motion information of inter block, including inter prediction direction, reference picture index, motion predictor and motion vector difference.

Figure 4:
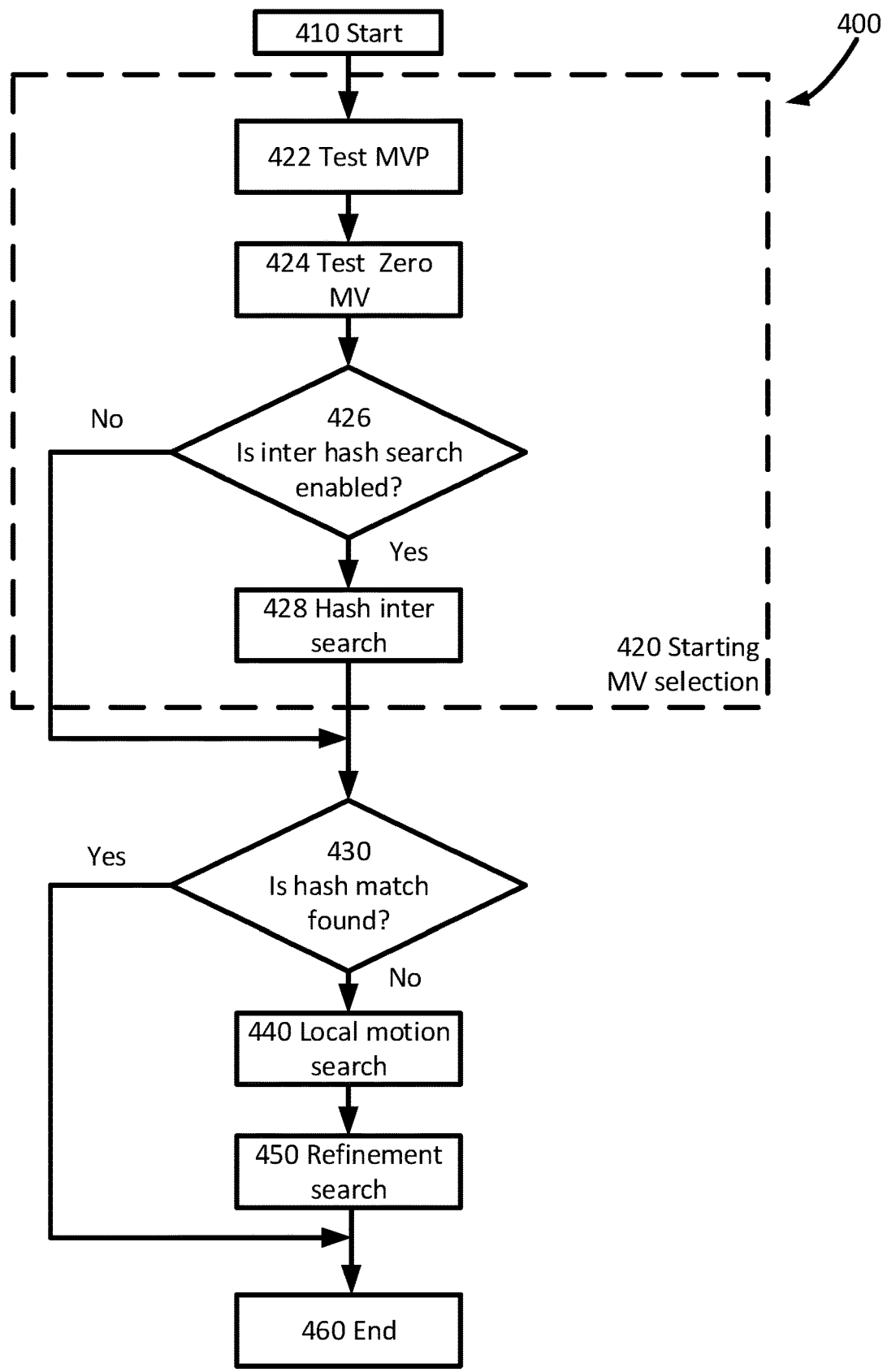
FIG. 4 is a flowchart showing motion estimation method, according to an example of the present disclosure.

To reduce the number of searching points, the TZ is applied for integer motion search which contains three steps as illustrated in FIG. 4.

FIG. 4 shows a flowchart of the motion estimation method in the VTM encoder. Specifically, FIG. 4 shows flowchart 400 with steps 410 start, 420 starting MV selection, 422 test MVP, 424 test zero MV, 426 is inter hash search enabled?, 428 hash inter search, 430 is hash match found?, 440 local motion search, 450 refinement search, and 460 end. The flowchart 400 starts at step 410 and continues to overall steps 420 starting MV selection that includes step 422 where test MVP is done, then 424 where test Zero MV is done, then decision 426 where it is determined if there is inter hash search enabled, if yes then step 428 occurs, otherwise step 430 is taken. In step 428 hash inter search is done and the flowchart continues to decision step 430 where it is determined if a has match is found. If decision step 430 is yes then step 460 is taken, otherwise step 440 is taken. In step 440 local motion search is done, then step 450 is done for refinement search, and finally step 460 is the end of the process.

Firstly, the MVP candidate obtained from the AMVP derivation process is checked. Then, zero MV (i.e., the MV pointing to the reference block at the same location of the current block in the reference picture) is checked. Additionally, in the VTM encoder, the hash-based motion estimation can be optionally enabled for 4×4, 4×8, 8×4, 8×8, 16×16, 32×32 and 64×64 blocks. Specifically, for each reference picture in the reference list L0 and L1, hash tables corresponding to those allowed block sizes are created for all possible reference blocks based on the 32-bit Cyclic Redundancy Check (CRC) value. Then, for each reference block in the hash tables, hash-based block matching is performed. When one hash match is identified, the corresponding reference block will be selected and the following motion search processes, including the rest of integer motion search, half-pel motion search and quarter-pel motion search can be early terminated. If hash match is not found, one local motion search is performed based on diamond search pattern. Further, one additional raster search is done when the difference between the output MV of the diamond search and the starting MV is larger than one pre-defined threshold.

Figure 5A:
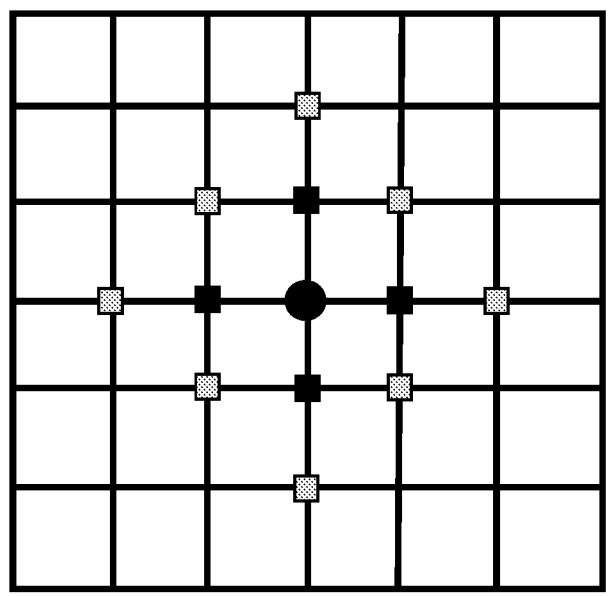
FIG. 5A is an illustration of a diamond search pattern, according to an example of the present disclosure.
Figure 5B:
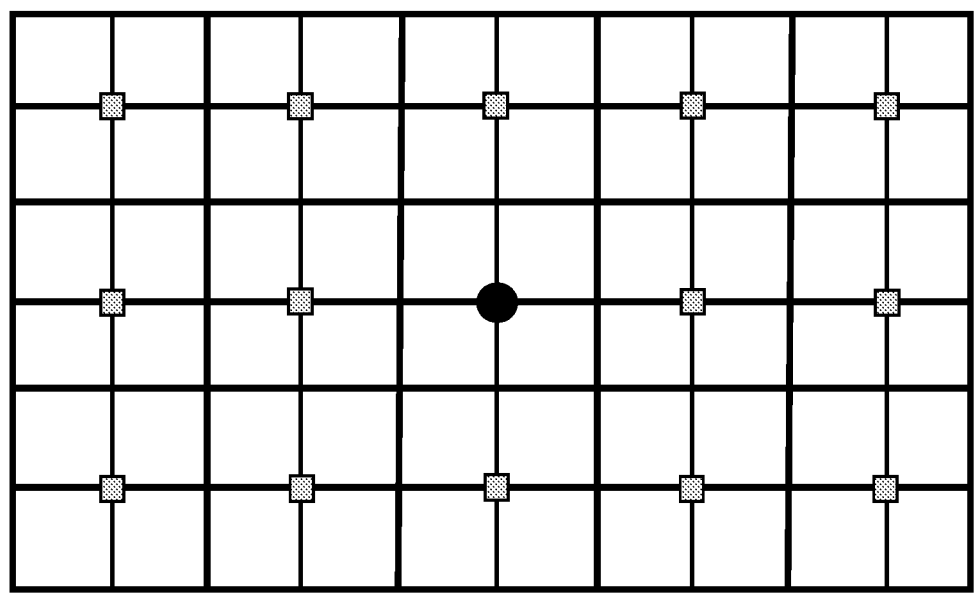
FIG. 5B is an illustration of a raster search pattern, according to an example of the present disclosure.

FIG. 5A shows an illustration of a diamond search pattern. FIG. 5A shows an illustration of a raster search pattern. Specifically, FIG. 5A shows squares 510 which are candidate positions having the same distance from the start position, squares 520 which are candidate positions having the same distance from the start position and circle 530 which is a starting position for the search pattern. FIG. 5B shows an illustration of the raster search. Specifically, FIG. 5B shows square 540 which are candidate positions having the same distance from the start position and circle 550 represent the starting position for the search pattern.

Affine Mode

In the HEVC standard, only translation motion model is applied for motion compensated prediction. While in the real world, there are many other kinds of motion, e.g., zoom in/out, rotation, perspective motions and other irregular motions. In the VVC, affine motion compensated prediction is applied by signaling one flag for each inter coding block to indicate whether the translation motion or the affine motion model is applied for inter prediction. In the current VVC design, two affine modes, including 4-parameter affine mode and 6-parameter affine mode, are supported.

The 4-parameter affine model has the following parameters: two parameters for translation movement in horizontal and vertical directions respectively, one parameter for zoom motion and one parameter for rotation motion for both directions. Horizontal zoom parameter is equal to vertical zoom parameter. Horizontal rotation parameter is equal to vertical rotation parameter. To achieve a better accommodation of the motion vectors and affine parameter, in the VVC, those affine parameters are translated into two MVs (which are also called control point motion vector (CPMV)) located at the top-left corner and top-right corner of a current block. The affine motion field of the block is described by two control point MVs ($V_0$, $V_1$). Based on the control point motion, the motion field ($v_x$, $v_y$) of one affine coded block is described as $$v_x = \frac{(v_{1x} - v_{0x})}{w}x - \frac{(v_{1y} - v_{0y})}{w}y + v_{0x} \quad (1)$$

$$v_y = \frac{(v_{1y} - v_{0y})}{w}x + \frac{(v_{1x} - v_{0x})}{w}y + v_{0y}$$

The 6-parameter affine mode has following parameters: two parameters for translation movement in horizontal and vertical directions respectively, one parameter for zoom motion and one parameter for rotation motion in horizontal direction, one parameter for zoom motion and one parameter for rotation motion in vertical direction. The 6-parameter affine motion model is coded with three MVs at three CPMVs. Three control points of one 6-parameter affine block are located at the top-left, top-right and bottom left corner of the block. The motion at top-left control point is related to translation motion, and the motion at top-right control point is related to rotation and zoom motion in horizontal direction, and the motion at bottom-left control point is related to rotation and zoom motion in vertical direction. Compared to the 4-parameter affine motion model, the rotation and zoom motion in horizontal direction of the 6-parameter may not be same as those motion in vertical direction. Assuming ($V_0$, $V_1$, $V_2$) are the MVs of the top-left, top-right and bottom-left corners of the current block, the motion vector of each sub-block ($v_x$, $v_y$) is derived using three MVs at control points as:

$$v_x = v_{0x} + (v_{1x} - v_{0x}) * \frac{x}{w} + (v_{2x} - v_{0x}) * \frac{y}{h} \quad (2)$$
$$v_y = v_{0y} + (v_{1y} - v_{0y}) * \frac{x}{w} + (v_{2y} - v_{0y}) * \frac{y}{h}$$

Affine Motion Estimation

For the existing affine motion estimation process (e.g., in the VTM), the motion model is selected based on the R-D cost of 4-parameter affine model and 6-parameter affine mode. As shown in (3), the R-D cost is calculated by considering the distortion measured by prediction error and the bits to code all the affine CPMVs. "o" denotes original signal and "p" denotes prediction signal; $R(MV_i)$ is the number of bits used for coding the i-th motion vector $MV_i$; K is the number of CPMVs. K is set to 1 for translation model, 2 for 4-parameter affine model and 3 for 6-parameter affine model. The lambda is the weighting factor between the distortion and the bit cost.

$$RD_{cost} = Dist(o, p) + \lambda \sum_{i=0}^{K-1} R(MV_i) \quad (3)$$

The encoder will firstly check the R-D cost of the translation motion model. If both the width and the height of the current block is greater than 8, then affine motion estimation with 4-parameter affine model is performed. If the R-D cost of the 4-parameter affine model is not too larger than that of the translational motion model, the encoder will further check affine motion cost with 6-parameter affine model. After that, the encoder will select a best motion model with minimal R-D cost. In order to reduce the 6-parameter affine motion estimation complexity, the encoder only performs affine motion estimation using the best reference picture selected by 4-parameter affine motion estimation. To estimate the CPMVs of one affine block (for either 4-parameter affine model or 6-parameter affine model), there are four steps: (1) generating the prediction with affine motion compensation; (2) calculating the spatial gradient in two directions with Sobel filtering; (3) calculating the correlation matrix based on the sample's gradient and its coordinates; (4) calculating the affine model parameters based on least mean square estimation (LMSE) and the control points' delta MVs with affine model parameters. The above process is repeated until the affine CPMVs are not updated after one iteration. As can be seen, the computation complexity of the affine motion estimation method is pretty high. In order to reduce the complexity of affine motion estimation, the starting point for 4-parameter affine motion estimation is selected from either affine MV predictor or the MV from translation motion model. The one with a smaller prediction error measured between original signal and prediction signal will be selected as a starting point for affine motion estimation. For 6-parameter affine motion estimation, the CPMVs of 4-parameter affine model are also included when deciding the corresponding starting point.

Adaptive Motion Vector Resolution

In VVC, a CU-level adaptive motion vector resolution (AMVR) scheme is introduced. AMVR allows MVD of one coding block to be coded in various precision. Dependent on the mode (normal AMVP mode or affine AVMP mode) for the current CU, the resolution of MVDs of the current coding block can be adaptively selected as follows:
  Normal AMVP mode: quarter-pel, integer-pel and four-pel
  Affine AMVP mode: quarter-pel, one-sixteen-pel and integer-pel.

The AMVR mode is conditionally signaled if the current coding block has at least one non-zero MVD component. If all MVDs (that is, both horizontal and vertical MVDs for reference list L0 and reference list L1) are zero, quarter-pel MVD resolution is inferred. When the AMVR mode is enabled, a first flag is signaled to indicate whether quarter-pel MVD precision is used for the block. If the first flag is 0, no further signaling is needed and quarter-pel MVD precision is applied. Otherwise, a second flag is signalled to indicate whether integer-pel or four-pel MVD precision is used for normal AMVP blocks or whether one-sixteenth-pel or integer-pel MVD is used for affine AMVR blocks. In order to ensure the reconstructed MV has the intended precision, the MVPs of the block will be rounded to the same precision as that of the MVD before being added together with the MVD.

The encoder determines the MV resolution for the current block by comparing the R-D costs. To reduce the encoding complexity, the R-D check with MVD precisions other than quarter-pel is conditionally invoked. For normal AVMP mode, the R-D cost with quarter-pel MVD precision and integer-pel MVD precision are firstly computed. When the R-D cost for quarter-pel MVD precision is much smaller than that of the integer-pel MVD precision, the R-D check of four-pel MVD precision is skipped. For affine AMVP mode, if affine AMVP mode is not selected after checking the R-D costs of affine merge/skip mode, merge/skip mode, quarter-pel normal AMVP mode and quarter-pel affine AMVP mode, then the encoder skips the R-D checking of one-sixteenth-pel MVD precision and one-pel MVD precision affine AMVP modes.

Improvements to Video Encoding

Although the existing motion estimation methods in the modern encoder have demonstrated its superior performance for inter coding, there are still some aspects in the current design that can be further improved, as discussed as follows:

First, as discussed earlier, the estimation process of affine parameters (i.e., CPMVs) is quite different from the motion estimation of regular inter mode. Specifically, instead of using block-matching based motion search, affine motion estimation is an iterative search method based on spatial gradient of prediction signal and difference between original signal and the prediction signal. Due to the high-frequency nature, the derived gradients are usually not reliable because of the presence of noise, e.g., the noise captured in original video and the coding noise that are generated during the coding process. This makes it difficult to derive accurate affine CPMVs based on such inaccurate gradients.

Second, As illustrated in the section "motion estimation for regular inter mode", the accuracy of the MVs derived from the motion estimation is highly dependent on the starting point MV that is used for the whole motion estimation process. In common encoder design, only the MVP candidate, the zero MV and the hash-based MV candidate (when the hash-based motion search is enabled) are used to select the starting point MV. When there is not enough correlation between the MVs of the current block and its neighboring blocks, the starting point MV derived from the above method is less accurate. This usually makes the whole MV search being trapped in one local minimal of two dimension (2-D) MV space.

Proposed Methods

In this disclosure, two encoder-side techniques are proposed to enhance the existing motion estimation algorithms that are used for regular inter modes and affine mode, whose main features are summarized as follows:

First, one improved CPMV scheme is proposed to enhance the precision of the estimated CPMVs of affine mode. The proposed method is built upon the idea of maintaining one group of the uni-prediction CPMVs of the previous affine blocks that are coded prior to the current CU according to the coding order. The maintained CPMVs will be used as the candidates to determine the CPMVs of the current CU.

Second, one gradient-based motion estimation algorithm is proposed to determine the target (e.g., optimal) MV of regular inter CUs. Different from the conventional block-matching based motion estimation, the proposed scheme is based on the optical flow concept which calculate the local gradients of the samples in the CU and use such gradient information to iteratively find the target MV of the CU.

Enhanced Affine Motion Estimation Based on the CPMVs of Previous Affine CUs

As mentioned in the section "motion estimation for regular inter mode", only the CPMV predictor is considered to determine the starting CPMV to determine the target (e.g., optimal) affine parameters of one current affine CU. Due to the fact that the CPMV predictor is derived from the spatial/temporal neighbors of the current block, such scheme is efficient when there is strong correlation between the CPMVs of the current CU and its neighbors. On the other hand, because of the versatile block partition structures applied in the VVC, each block can be further partitioned by multiple tree partitions, i.e., quad-tree, binary-tree and ternary-tree. Thus, there could be strong correlation between the CPMVs of the blocks at different coding tree levels or the MVs of spatial non-adjacent blocks. For example, in one flat region with less textures, one coding block tends to select the same or similar CPMVs as the larger coding blocks from its parent levels. In another example, when the ternary tree partition is applied, one coding block is further split into three sub-partitions with ratio of 1:2:1 (as shown in FIGS. 3A-3E) in either horizontal or vertical direction. Such partition usually works for the scenario where there is one foreground object located in the center part of the current block while the left and right parts belong to background. When such case happens, the correlation between the left and right parts will be stronger than that between the center partition and the left (or right) partition.

To further improve the efficiency of motion estimation, one CPMV-library-based scheme is proposed to improve the efficiency of affine motion estimation where the CPMV library contains the target (e.g., optimal) CPMVs that are determined for each picture in every reference picture list of the previously coded affine CUs. The CPMV candidates in the library will be used as the candidates to determine the target CPMV during the affine motion estimation process of the current CU. Specifically, each entry of the list contains two kinds of information: 1) the position and block size (i.e., width and height) of the block; 2) for each CPMV one indicator to distinguish whether the CPMV associated with one 4-parameter affine parameter or one 6-parameter affine parameter. Further, given the CPMVs of the affine mode of one block in the library, the corresponding CPMVs of the current CU can be derived according to the following four cases. In the following derivations, block B is the selected block with the coordinate (xB, yB) in the library and the width and height of the block are wB and hB, respectively; {MV0, MV1, MV2} are three CPMVs of the block B; block C is the current CU with coordinate (xC, yC) and the width and height of the block are wC and hC.

Case #1: block B and C are associated with 4-parameter affine mode. In such case, the top-left CPMV of the block C is derived as $$v_x^0 = \qquad (4)$$
$$MV0_x + (MV1_x - MV0_x) \cdot \frac{(xC - xB)}{wB} - (MV1_y - MV0_y) \cdot \frac{(yC - yB)}{wB}$$
$$v_y^0 = MV0_y + (MV1_y - MV0_y) \cdot \frac{(xC - xB)}{wB} + (MV1_x - MV0_x) \cdot \frac{(yC - yB)}{wB}$$

And the top-right CPMV of the block C is derived as $$v_x^1 = MV0_x + \qquad (5)$$
$$(MV1_x - MV0_x) \cdot \frac{(xC + wC - xB)}{wB} - (MV1_y - MV0_y) \cdot \frac{(yC - yB)}{wB}$$
$$v_y^1 =$$
$$MV0_y + (MV1_y - MV0_y) \cdot \frac{(xC + wC - xB)}{wB} - (MV1_x - MV0_x) \cdot \frac{(yC - yB)}{wB}$$

Case #2: block B is associated with 4-parameter affine mode and block C is associated with 6-parameter affine mode. In such case, the top-left CPMV and the top-right CPMV of the block C are derived in the same way using equations (4) and (5). And the bottom-left CPMV of the block C is derived as $$v_x^2 = MV0_x + (MV1_x - MV0_x) \cdot \frac{(xC - xB)}{wB} - \qquad (6)$$
$$(MV1_y - MV0_y) \cdot \frac{(yC + hC - yB)}{wB}$$
$$v_y^2 =$$
$$MV0_y + (MV1_y - MV0_y) \cdot \frac{(xC - xB)}{wB} + (MV1_x - MV0_x) \cdot \frac{(yC + hC - yB)}{wB}$$

Case #3: block B and C are associated with 6-parameter affine mode. In such case, the top-left, top-right and bottom-left CPMVs of the block C are derived as $$v_x^0 = \qquad (7)$$
$$MV0_x + (MV1_x - MV0_x) \cdot \frac{(xC - xB)}{wB} + (MV2_x - MV0_x) \cdot \frac{(yC - yB)}{hB}$$
$$v_y^0 = MV0_y + (MV1_y - MV0_y) \cdot \frac{(xC - xB)}{wB} + (MV2_y - MV0_y) \cdot \frac{(yC - yB)}{hB}$$
$$v_x^1 = MV0_x + \qquad (8)$$
$$(MV1_x - MV0_x) \cdot \frac{(xC + wC - xB)}{wB} + (MV2_x - MV0_x) \cdot \frac{(yC - yB)}{hB}$$
$$v_y^1 =$$
$$MV0_y + (MV1_y - MV0_y) \cdot \frac{(xC + wC - xB)}{wB} + (MV2_y - MV0_y) \cdot \frac{(yC - yB)}{hB}$$

-continued $$v_x^2 = MV0_x + (MV1_x - MV0_x) \cdot \frac{(xC - xB)}{wB} + \qquad (9)$$

$$(MV2_x - MV0_x) \cdot \frac{(yC + hC - yB)}{hB}$$

$$v_y^2 =$$

$$MV0_y + (MV1_y - MV0_y) \cdot \frac{(xC - xB)}{wB} + (MV2_y - MV0_y) \cdot \frac{(yC + hC - yB)}{hB}$$

Case #4: block B is associated with 6-parameter affine mode and block C is associated with 4-parameter affine mode. In such case, the top-left and top-right CPMVs of the block C are calculated as $$v_x^0 = \qquad (10)$$

$$MV0_x + (MV1_x - MV0_x) \cdot \frac{(xC - xB)}{wB} + (MV2_x - MV0_x) \cdot \frac{(yC - yB)}{hB}$$

$$v_y^0 = MV0_y + (MV1_y - MV0_y) \cdot \frac{(xC - xB)}{wB} + (MV2_y - MV0_y) \cdot \frac{(yC - yB)}{hB}$$

$$v_x^1 = MV0_x + (MV1_x - MV0_x) \cdot \frac{(xC + wC - xB)}{wB} + \qquad (11)$$

$$(MV2_x - MV0_x) \cdot \frac{(yC - yB)}{hB}$$

$$v_y^1 =$$

$$MV0_y + (MV1_y - MV0_y) \cdot \frac{(xC + wC - xB)}{wB} + (MV2_y - MV0_y) \cdot \frac{(yC - yB)}{hB}$$

There may be multiple ways to apply the CPMV candidates in the library for affine motion estimation. In one or more methods, it is proposed to use the additional CPMV candidates in the library together with the existing CPMV predictor to determine the starting CPMVs for the affine motion estimation.

Figure 6:
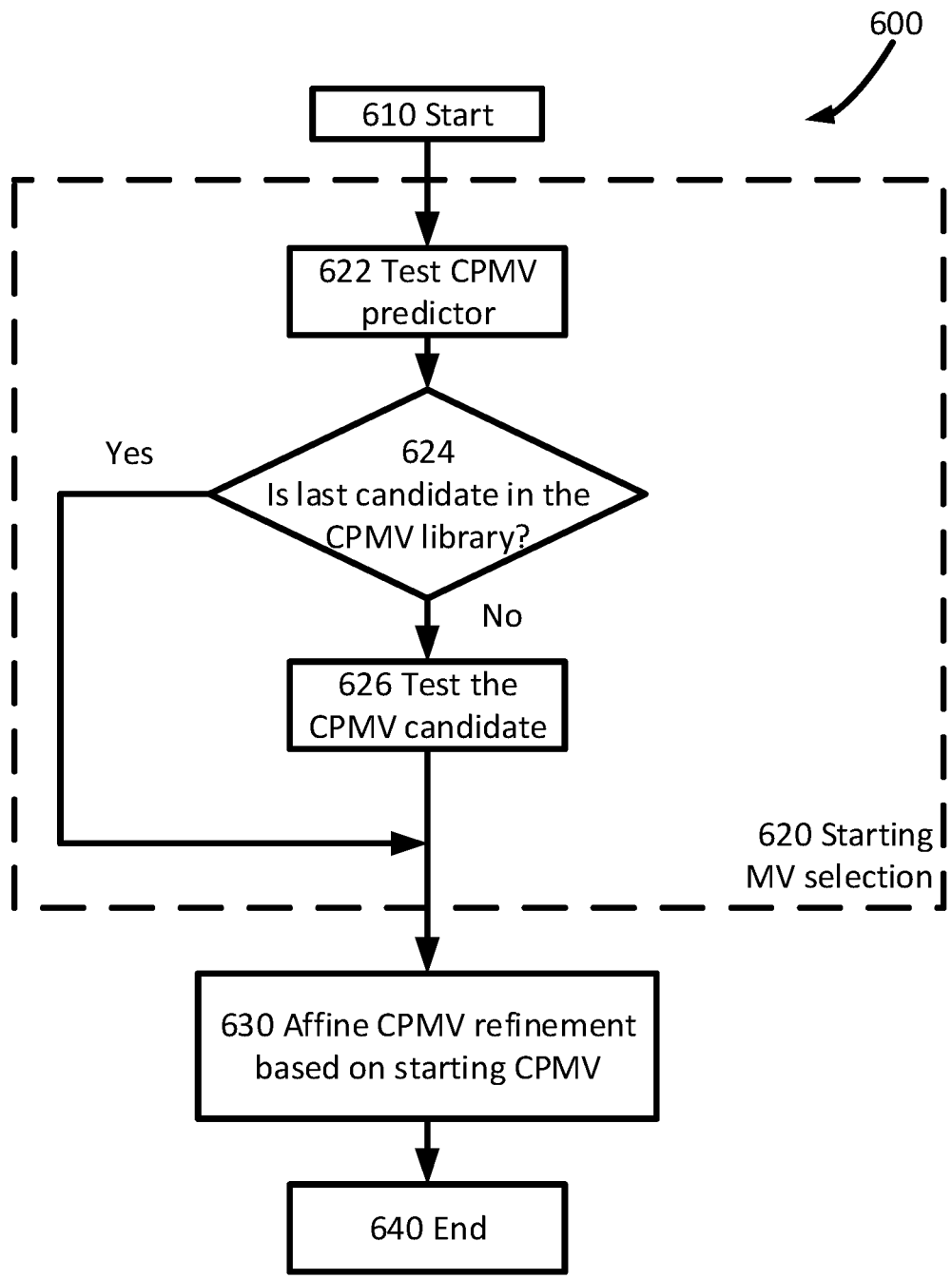
FIG. 6 is a flowchart of a modified motion estimation process, according to an example of the present disclosure.

FIG. 6 shows a flowchart of a modified affine motion estimation process, according to a first proposed method. FIG. 6 illustrates the corresponding workflow when the CPMV candidates in the CPMV library are used to select the starting CPMV for the affine motion estimation. As shown in FIG. 6, the CPMV candidates in the library are competing with the default CPMV predictor and the one with lower RD cost (as calculated in equation (3)) is selected as the starting CPMV which will be used as the input CPMV for gradient-based local affine CPMV refinement process. In one or more methods, it is proposed to select the best candidate from the CPMV library at first which is then refined through the local affine CPMV refinement; then, the derived CPMV will compete with the derived CPMV by the local CPMV refinement that use the default CPMV predictor as starting point. Specifically, FIG. 6 shows flowchart 600 with steps 610 start, 620 starting MV selection, 622 test CPMV predictor, 624 is last candidate in the CPMV library?, 626 test the CPMV candidate, 630 Affine CPMV refinement based on starting CPMV, and 640 end. Flowchart 600 starts in step 610 and continues to overall steps 620 for starting MV selection. In overall step 620, step 622 tests CPMV predictor, then decision 624 decides is last candidate in the CPMV library?. If step 624 is yes then step 630 is taken, otherwise step 626 is taken where test the CPMV candidate is done. In step 630 affine CPMV refinement based on starting CPMV is done and then step 640 is done and ends the process 600.

Figure 7:
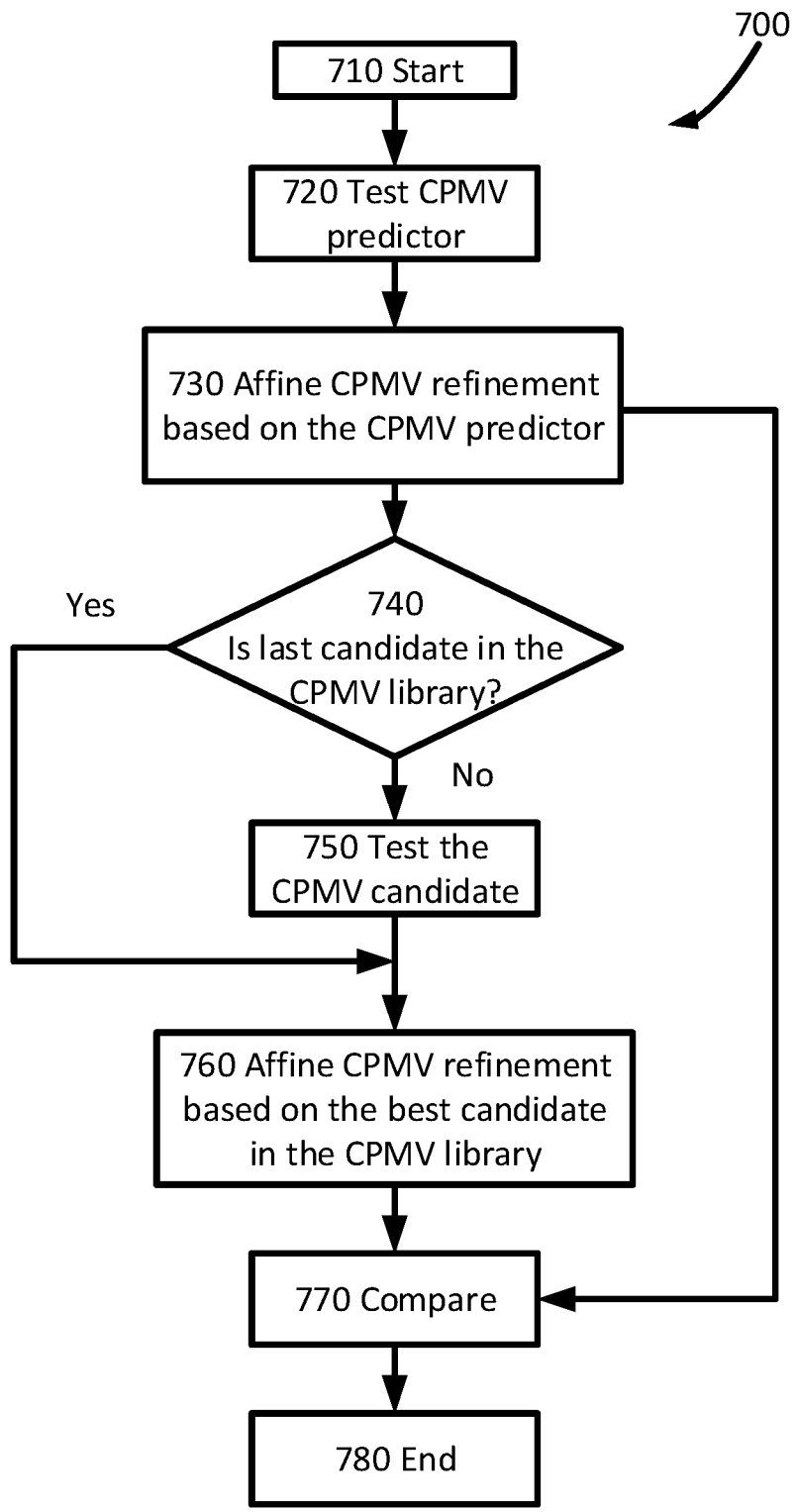
FIG. 7 is a flowchart of a modified motion estimation process, according to an example of the present disclosure.

FIG. 7 shows a flowchart of a modified affine motion estimation, according to a second proposed method. FIG. 7 illustrates the corresponding process of the affine motion estimation when such method is applied. Specifically, FIG. 7 shows flowchart 700 with step 710 start, 720 test CPMV predictor, 730 affine CPMV refinement based on the CPMV predictor, 740 is last candidate in the CPMV library?, 750 test the CPMV candidate, 760 affine CPMV refinement based on the best candidate in the CPMV library, 770 compare, and 780 end. Flowchart starts in step 710 and continues to step 720 where test CPMV predictor is done, then 730 where affine CPMV refinement based on the CPMV predictor is done, and then the process continues to step 740 and 770. In decision step 740 is last candidate in the CPMV library is determined. If decision 740 is yes then step 760 is taken, otherwise step 750 is done and test the CPMV candidate is performed. In step 760 affine CPMV refinement based on the best candidate in the CPMV library is done, then 770 compares information from step 760 and step 730. The process then continues to step 780 and ends.

After the affine motion estimation of one CU is done, the CPMV library may be updated by merging the CPMVs of the current CU into the CPMV library. Specifically, the CPMV library may be updated in the following way. If there is an entry in the library and the entry has the same block position, block width and block height as the current block, then the CPMVs of the entry are updated with the CPMVs of the current block. Otherwise (there is no duplicated entry in the library), the current block is added as one new candidate to replace the oldest candidate in the library based on First-in-first-out (FIFO) rule. In addition, given the strong correlation between the MV of one block and that of its parent blocks, before one specific block partition is applied, the CPMVs from the parent block level is always kept in the library.

Gradient-Based Motion Estimation Algorithm for Regular Inter Mode

As mentioned earlier, the accuracy of the MVs derived from the motion estimation is highly dependent on the starting point MV which is selected from the MVP candidate, the zero MV and the hash-based MV candidate. In case when the starting point MV is less accurate, the entire MV search process may be easily trapped in one local minimal of two dimension (2-D) MV space. To solve such issue, one alternative motion estimation algorithm is proposed to calculate the target MV for the regular inter mode. The proposed method is based on the classical optical flow model that states that the brightness of one picture keeps constant with the change of time, i.e., $$E(x,y,t)=E(x+dx,y+dy,t+dt) \qquad (12)$$

where x and y represent spatial coordinate and t represent time. The right-hand side of the equation can be expanded by Talyor's series about (x, y, t). After that, the optical flow equation becomes $$\frac{\partial E(x, y, t)}{\partial t}dt + \frac{\partial E(x, y, t)}{\partial x}dx + \frac{\partial E(x, y, t)}{\partial y}dy = 0 \qquad (13)$$

Assuming camera's capturing time is used as the basic unit of time (i.e., dt=1), equation (13) can be discretized by changing the optical flow function from continuous domain to discrete domain. Let l(x, y) be the sample value captured from camera, then equation (13) becomes the following.

$$\frac{\partial I(x, y, t)}{\partial t} + \frac{\partial I(x, y, t)}{\partial x}\Delta x + \frac{\partial I(x, y, t)}{\partial y}\Delta y = 0 \qquad (14)$$

The optical flow model in equation (14) can be used to directly derive the MV difference as depicted as $$G_x \Delta x + G_y \Delta y = P^{org} - P^{pred} \quad (15)$$

where $P^{org}$ and $P^{pred}$ are the original signal and the prediction signal using the current MV; $G_x$ and $G_y$ are the horizontal/vertical gradients of prediction signal $P^{pred}$, which can be calculated based on different gradient filters, e.g., the simple sobel filter. The equation (15) represents a set of equations: one equation for each sample where one individual $G_x$, $G_y$ and $P^{org} - P^{pred}$ can be calculated. With two unknown parameters $\Delta x$ and $\Delta y$, the overdetermined problem (as shown in (15)) can be solved by minimizing the sum of squared errors of equation as $$(\Delta x, \Delta y)^* = \underset{(\Delta x, \Delta y)}{\operatorname{argmin}} \sum_{(i,j) \in \theta} (G_x \Delta x + G_y \Delta y - G_t)^2 \quad (16)$$

where $G_t = P^{org} - P^{pred}$ Based on the equation (16), the closed-form solution of $(\Delta x, \Delta y)$ can be derived as $$\Delta x^* = \frac{\sum_{(i,j)} (G_t G_x) \sum_{(i,j)} (G_y)^2 - \sum_{(i,j)} (G_t G_y) \sum_{(i,j)} (G_x G_y)}{\sum_{(i,j)} (G_x)^2 \sum_{(i,j)} (G_y)^2 - \left(\sum_{(i,j)} (G_x G_y)\right)^2} \quad (17)$$

$$\Delta y^* = \frac{\sum_{(i,j)} (G_t G_y) \sum_{(i,j)} (G_x)^2 - \sum_{(i,j)} (G_t G_x) \sum_{(i,j)} (G_x G_y)}{\sum_{(i,j)} (G_x)^2 \sum_{(i,j)} (G_y)^2 - \left(\sum_{(i,j)} (G_x G_y)\right)^2}$$

In equation (17), a first correlation parameter (i.e. $\Sigma_{(i,j)}(G_tG_x)$) is derived based on a summation of a multiplication of the sample difference (i.e. $G_t$) and the horizontal gradient (i.e. $G_x$) at each prediction sample in the video block; a second correlation parameter (i.e. $\Sigma_{(i,j)}(G_tG_y)$) is derived based on a summation of a multiplication of the sample difference and the vertical gradient (i.e. $G_y$) at each prediction sample in the video block; a third correlation parameter (i.e. $\Sigma_{(i,j)}(G_xG_y)$) is derived based on a summation of a multiplication of the horizontal and vertical gradients at each prediction sample in the video block; a first quadratic parameters (i.e. $\Sigma_{(i,j)}(G_x)^2$) is derived based on a summation of a squared horizontal gradient at each prediction sample in the video block; a second quadratic parameters (i.e. $\Sigma_{(i,j)}(G_y)^2$) is derived based on a summation of a squared vertical gradient at each prediction sample in the video block; a first numerator (i.e. $\Sigma_{(i,j)}(G_tG_x) \Sigma_{(i,j)}(G_y)^2 - \Sigma_{(i,j)}(G_tG_y) \Sigma_{(i,j)}(G_xG_y)$) is derived as the difference between a multiplication of the first correlation parameter and the second quadratic parameter, and a multiplication of the second correlation parameter and the third correlation parameter; a first denominator (i.e. $\Sigma_{(i,j)}(G_x)^2 \Sigma_{(i,j)}(G_y)^2 - (\Sigma_{(i,j)}(G_xG_y))^2$) is derived as the difference between a multiplication of a squared first parameter (i.e. $\Sigma_{(i,j)}(G_x)$) and a squared second parameter (i.e. $\Sigma_{(i,j)}(G_y)$), and a squared third correlation parameter; a second numerator (i.e. $\Sigma_{(i,j)}(G_tG_y) \Sigma_{(i,j)}(G_x)^2 - \Sigma_{(i,j)}(G_tG_x) \Sigma_{(i,j)}(G_xG_y)$) is derived as the difference between a multiplication of the second correlation parameter and the first quadratic parameter, and a multiplication of the first correlation parameter and the third correlation parameter; and a second denominator (i.e. $\Sigma_{(i,j)}(G_x)^2 \Sigma_{(i,j)}(G_y)^2 - (\Sigma_{(i,j)}(G_xG_y))^2$) is derived as the difference between a multiplication of the squared first parameter and the squared second parameter, and the squared third correlation parameter.

Based on equation (17), the proposed gradient-based motion estimation algorithm can identify the target motion refinements (i.e., $(\Delta x, \Delta y)^*$) in a recursive manner. It works by firstly generating the initial prediction signal of the current block and calculating the corresponding delta motion $(\Delta x, \Delta y)^*$ based on (17); the refined MV which is calculated as $(MV'_x, MV'_y) = (MV_x, MV_y) + (\Delta x, \Delta y)$ will be used as the motion to generated new prediction samples, which are then to update the values of the local refinement $(\Delta x, \Delta y)^*$. The above is repeated until the MVs are not updated or the maximum number of iterations is reached. Specifically, the above process is summarized by the following procedures at an encoder:

Step 1: set l=0. generating the initial prediction signal $P^{(l)}$ according to the a starting MV $MV^{(l)}$ of the block. The starting MV, for example, may be an original MV or a first MV calculated or obtained.

Step 2: Calculating the motion refinement $(\Delta x, \Delta y)$ based on (17) and update the MV of the block as $MV_x^{l+1} = MV_x^{(l)} + \Delta x$ and $MV_y^{(l+1)} = MV_y^{(l)} + \Delta y$.

Step 3: If $\Delta x$ and $\Delta y$ are zero or $l = l_{max}$, stop the process; otherwise, go to Step 4.

Step 4: Updating the prediction signal $P^{(l+1)}$ using the MV $MV^{(l+1)}$.

Step 5: Setting l=l+1 and go to Step 2.

The gradient-based motion estimation algorithm as proposed above can be applied with or without the conventional block-matching based motion estimation scheme in the encoder. In one method, it is proposed to use the gradient-based motion estimation algorithm to replace the entire block-matching motion estimation. In another method, it is proposed to perform both the gradient motion estimation as well as the block-matching based motion estimation and calculate the R-D cost of two methods separately; the derived MV of the scheme with smaller R-D cost will be selected as the final MV of the block.

Figure 8:
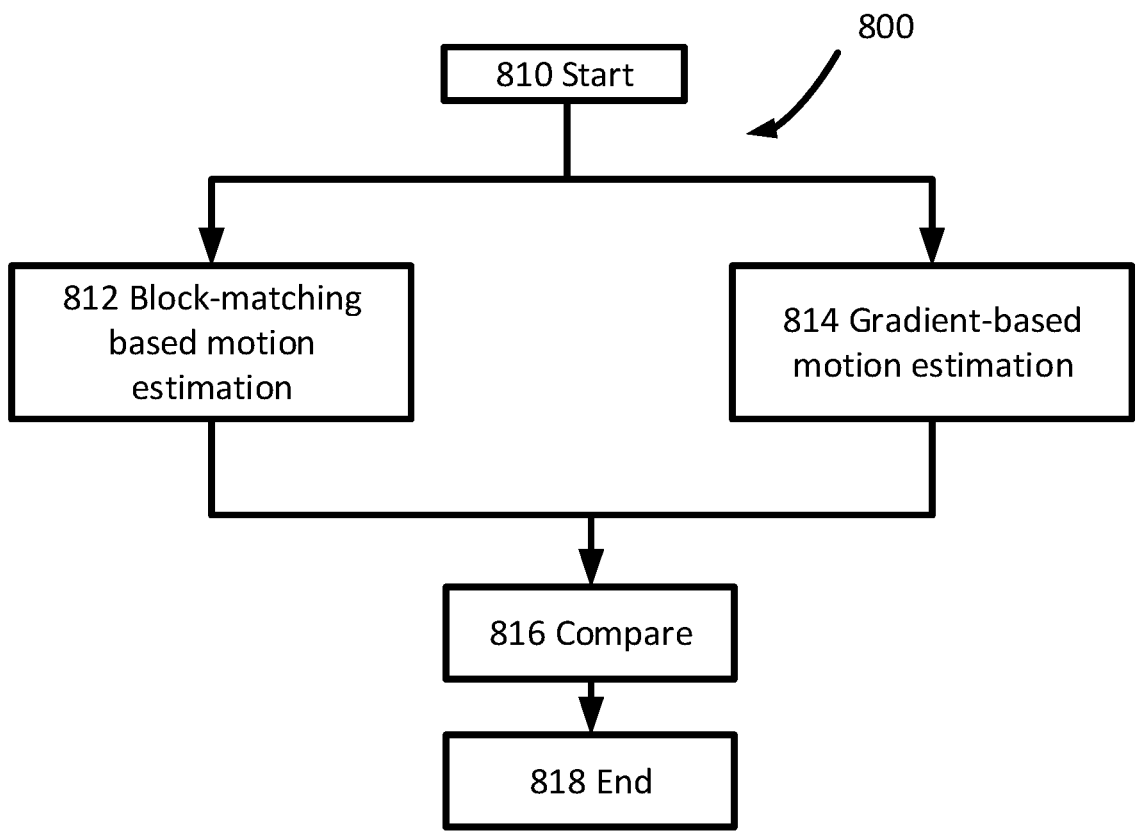
FIG. 8 is a flowchart of a modified motion estimation process, according to an example of the present disclosure.

FIG. 8 shows a flowchart of a motion estimation where the gradient-based motion estimation and the block-matching-based motion estimation are jointly applied. Specifically, FIG. 8 shows flowchart 800 with step 810 start, 812 block-matching based motion estimation, 814 gradient-based motion estimation, 816 compare, and 818 end. Flowchart 800 starts in step 810 and continues to both step 812 and 814. Information from steps 812 and 814 are compared in step 816 and the flowchart ends in step 818.

FIG. 8 shows the diagram when the two methods are jointly applied. Additionally, when both two methods are applied, the motion estimation complexity at the encoder side could be significantly increased. To reduce the encoding complexity, in one method, it is proposed to only enable the gradient-based motion estimation for the motion search of one inter CU at certain motion precision. As one specific example, the gradient-based motion estimation is enabled for the motion estimation at MV precisions of ¼-pel, ½-pel and 1-pel but disabled at MV precisions beyond 1-pel. In another method, it is proposed to only enable the gradient-based motion estimation for the motion estimation of low-delay pictures, where the low-delay picture refers to one picture where the picture order counts (POC) of all the reference pictures of the picture are smaller than the POC of the current picture.

Figure 9:
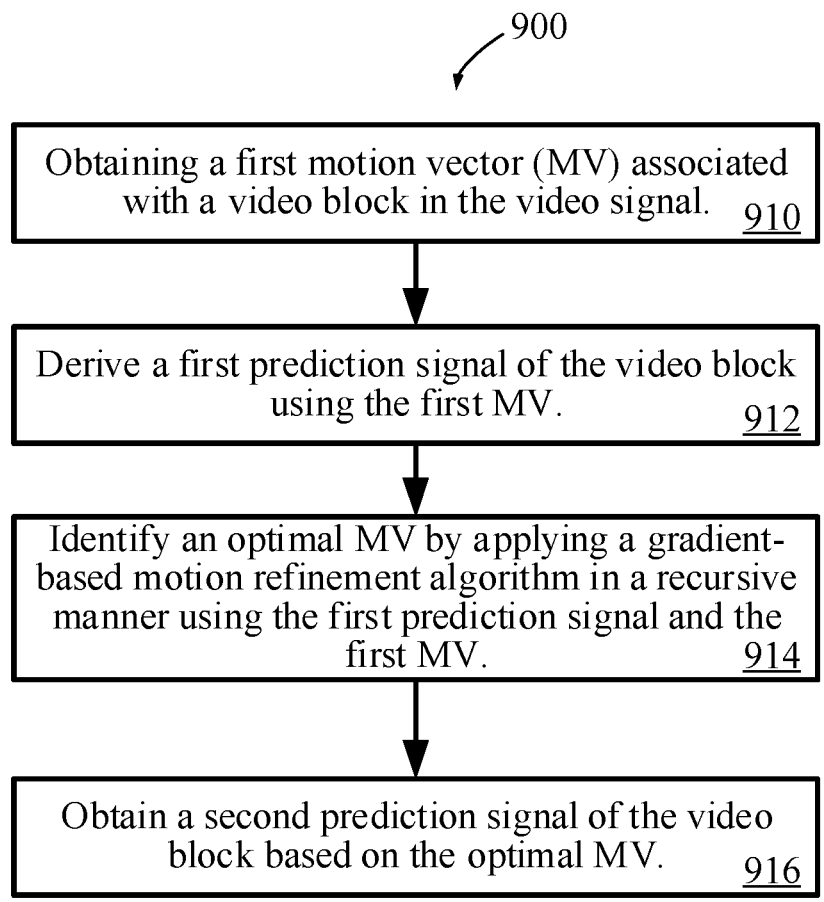
FIG. 9 is a method for encoding video, according to an example of the present disclosure.

FIG. 9 shows a method for encoding video. The method may be, for example, applied to an encoder.

In step 910, the encoder obtains first motion vector (MV) associated with a video block obtained from the video. The encoder, for example, obtains initial MV associated with the video block based the amount and the direction of motion between the current video block and its temporal reference.

In step 912, the encoder derives a first prediction signal of the video block using the first MV.

In step 914, the encoder identifies a target MV by applying a gradient-based motion refinement algorithm in a recursive manner using the first prediction signal and the first MV. The encoder, for example, may calculate a target MV to be used as a starting point by using the gradient-based motion refinement algorithm in a recursive manner. In another example, the encoder may use the first MV associated with the video block as a starting MV.

In step 916, the encoder obtains a second prediction signal of the video block based on the target MV.

Figure 10:
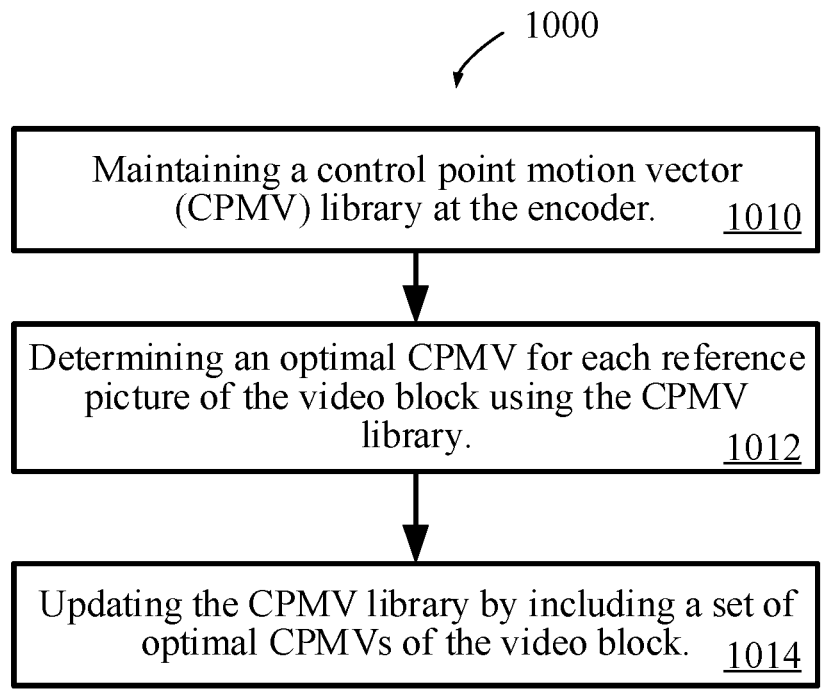
FIG. 10 is a method for encoding a video block in a video bitstream, according to an example of the present disclosure.

FIG. 10 shows a method for encoding a video block in a video bitstream. The method may be, for example, applied to an encoder.

In step 1010, the encoder maintains a CPMV library at the encoder. The CPMV library may include one or more sets of CPMVs that are determined for different reference pictures in reference lists of previously coded video blocks. The CPMV library, for example, is maintained to store target CPMVs of each picture in every reference picture list of the previously coded affine video blocks.

In step 1012, the encoder determines a target CPMV for each reference picture of the video block using the CPMV library. The encoder, for example, may use additional CPMV candidates in the library together with the existing CPMV predictor to determine target CPMVs for the affine motion estimation. The encoder, in another example, may select the best candidate from the CPMV library at first which is then refined through the local affine CPMV refinement and then the derived CPMV will compete with the derived CPMV by the local CPMV refinement that use the default CPMV predictor as starting point.

In step 1014, the encoder updates the CPMV library by including a set of target CPMVs of the video block. Each CPMV may correspond to a reference picture of the video block and is used to replace one or more existing CPMV sets in the MV library.

In an example, each element in the CPMV library includes a position of the video block, a video block size, and whether the CPMV is associated with a 4-parameter affine parameter or a 6-parameter affine parameter.

In an example, updating the CPMV library includes using a first-in-first-out (FIFO) strategy.

In an example, determining the target CPMV for each reference picture of the video block using the CPMV library includes: generating a list of CPMV candidates that includes a CPMV predictor and elements that are associated with the reference picture in the CPMV library; calculating a rate-distortion (R-D) cost of each element in the list and selecting the a CPMV that minimizes the R-D cost as a starting point CPMV; and deriving the target CPMV based on a local CPMV refinement process based on the starting point CPMV.

In an example, determining the target CPMV for each reference picture of the video block using the CPMV library includes: calculating a rate-distortion (R-D) cost of each element in the CPMV library and selecting a CPMV that minimizes the R-D cost as a first starting point CPMV; deriving a first target CPMV based on a local CPMV refinement process using the first starting point CPMV; obtaining a CPMV predictor as a second starting point CPMV; deriving a second target CPMV based on the same local CPMV refinement process using the second starting point CPMV; and selecting the target CPMV from the first target CPMV and the second CPMV that minimizes the R-D cost.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

Figure 11:
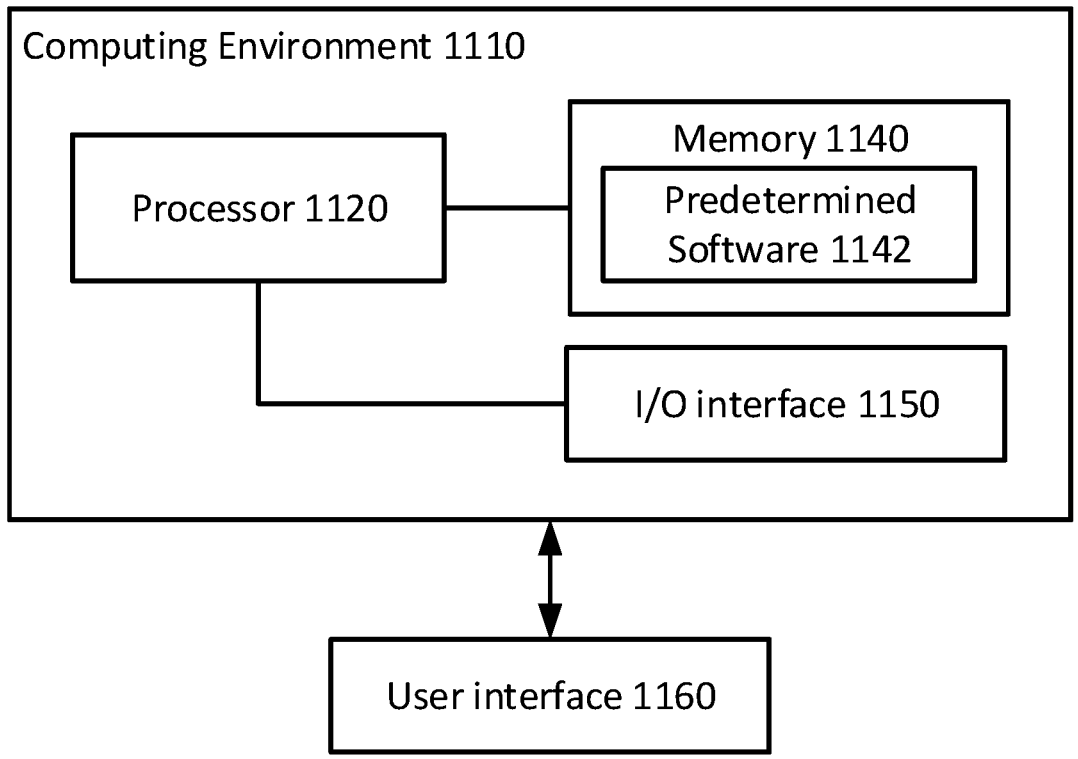
FIG. 11 is a diagram illustrating a computing environment coupled with a user interface, according to an example of the present disclosure.

FIG. 11 shows a computing environment 1110 coupled with a user interface 1160. The computing environment 1110 can be part of a data processing server. The computing environment 1110 includes processor 1120, memory 1140, and I/O interface 1150.

The processor 1120 typically controls overall operations of the computing environment 1110, such as the operations associated with the display, data acquisition, data communications, and image processing. The processor 1120 may include one or more processors to execute instructions to perform all or some of the steps in the above-described methods. Moreover, the processor 1120 may include one or more modules that facilitate the interaction between the processor 1120 and other components. The processor may be a Central Processing Unit (CPU), a microprocessor, a single chip machine, a GPU, or the like.

The memory 1140 is configured to store various types of data to support the operation of the computing environment 1110. Memory 1140 may include predetermined software 1142. Examples of such data include instructions for any applications or methods operated on the computing environment 1110, video datasets, image data, etc. The memory 1140 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1150 provides an interface between the processor 1120 and peripheral interface modules, such as a keyboard, a click wheel, buttons, and the like. The buttons may include but are not limited to, a home button, a start scan button, and a stop scan button. The I/O interface 1150 can be coupled with an encoder and decoder.

In some embodiments, there is also provided a non-transitory computer-readable storage medium comprising a plurality of programs, such as comprised in the memory 1140, executable by the processor 1120 in the computing environment 1110, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 1110 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for encoding video, comprising:
    obtaining a first motion vector (MV) associated with a video block obtained from a video;
    deriving a first prediction signal of the video block using the first MV;
    identifying a target MV by applying a gradient-based motion refinement algorithm in a recursive manner using the first prediction signal and the first MV; and
    obtaining a second prediction signal of the video block based on the target MV,
    wherein identifying the target MV by applying the gradient-based motion refinement algorithm in the recursive manner using the first prediction signal and the first MV comprises:
    determining the target MV by iteratively deriving motion refinements for a MV of the video block based on gradients of prediction samples in the video block using the first prediction signal as an initial prediction signal and using the first MV as an initial MV,
    wherein the motion refinements comprise a horizontal motion refinement and a vertical motion refinement, wherein the gradients of the prediction samples comprise sample differences between a prediction sample and corresponding original sample, and a horizontal gradient and a vertical gradient of the prediction sample, and wherein deriving the motion refinements for the MV of the video block based on the gradients of the prediction samples in the video block comprises:
    deriving a first correlation parameter based on a summation of a multiplication of the sample difference and the horizontal gradient at each prediction sample in the video block;
    deriving a second correlation parameter based on a summation of a multiplication of the sample difference and the vertical gradient at each prediction sample in the video block;
    deriving a third correlation parameter based on a summation of a multiplication of the horizontal and vertical gradients at each prediction sample in the video block;
    deriving a first and second quadratic parameters based on a summation of a squared horizontal gradient at each prediction sample in the video block, and a summation of a squared vertical gradient at each prediction sample in the video block, respectively;
    deriving a first numerator as the difference between a multiplication of the first correlation parameter and the second quadratic parameter, and a multiplication of the second correlation parameter and the third correlation parameter;
    deriving a first denominator as the difference between a multiplication of a squared first parameter and a squared second parameter, and a squared third correlation parameter;
    deriving a second numerator as the difference between a multiplication of the second correlation parameter and the first quadratic parameter, and a multiplication of the first correlation parameter and the third correlation parameter;
    deriving a second denominator as the difference between a multiplication of the squared first parameter and the squared second parameter, and the squared third correlation parameter;
    obtaining the horizontal motion refinement based on a ratio of the first numerator to the first denominator; and
    obtaining the vertical motion refinement based on a ratio of the second numerator to the second denominator.

2. The method of claim 1, wherein determining the target MV by iteratively deriving motion refinements for a MV of the video block based on gradients of prediction samples in the video block using the first prediction signal as an initial prediction signal and using the first MV as an initial MV comprises:
    deriving motion refinements based on gradients of prediction samples in the first prediction signal;
    obtaining an updated MV by adding the motion refinements to the first MV of the video block;
    deriving, in response to determining that a stop condition is not satisfied, an updated prediction signal based on the updated MV, setting the updated prediction signal as the first prediction signal, setting the updated MV as the first MV and deriving the motion refinements based on the gradients of the prediction samples in the first prediction signal; and
    terminating, in response to determining that a stop condition is satisfied, the gradient-based motion refinement algorithm, and determining the updated MV as the target MV.

3. The method of claim 2, wherein the stop condition is based on magnitudes of horizontal and vertical gradients being equal to or smaller than a first preset value.

4. The method of claim 2, wherein the stop condition is based on a number of gradient-based motion refinements being iterated reaching a second preset value.

5. The method of claim 1, wherein identifying the target MV by applying the gradient-based motion refinement algorithm in the recursive manner using the first prediction signal and the first MV comprises:
  obtaining a first target MV based on the gradient-based motion refinement algorithm;
  obtaining a second target MV based on a block-matching motion estimation algorithm; and
  selecting the target MV of the video block from the first target MV and the second target MV.

6. The method of claim 5, wherein selecting the target MV of the video block from the first target MV and the second target MV comprises:
  calculating a rate-distortion (R-D) cost associated with the first target MV;
  calculating a R-D cost of the second target MV;
  selecting the first target MV based on that the R-D cost of the first MV is less than the R-D cost of the second MV; and
  selecting the second target MV based on that the R-D cost of the second MV is less than the R-D cost of the first MV.

7. A computing device, comprising:
  one or more processors; and
  a non-transitory computer-readable storage medium storing instructions executable by the one or more processors, wherein the one or more processors are configured to perform operations comprising:
    obtaining a first motion vector (MV) associated with a video block obtained from the video;
    deriving a first prediction signal of the video block using the first MV;
    identifying a target MV by applying a gradient-based motion refinement algorithm in a recursive manner using the first prediction signal and the first MV; and
    obtaining a second prediction signal of the video block based on the target MV,
    wherein identifying the target MV by applying the gradient-based motion refinement algorithm in the recursive manner using the first prediction signal and the first MV comprises:
    determining the target MV by iteratively deriving motion refinements for a MV of the video block based on gradients of prediction samples in the video block using the first prediction signal as an initial prediction signal and using the first MV as an initial MV,
    wherein the motion refinements comprise a horizontal motion refinement and a vertical motion refinement, wherein the gradients of the prediction samples comprise sample differences between a prediction sample and corresponding original sample, and a horizontal gradient and a vertical gradient of the prediction sample, and wherein deriving the motion refinements for the MV of the video block based on the gradients of the prediction samples in the video block comprises:
      deriving a first correlation parameter based on a summation of a multiplication of the sample difference and the horizontal gradient at each prediction sample in the video block;
      deriving a second correlation parameter based on a summation of a multiplication of the sample difference and the vertical gradient at each prediction sample in the video block;
      deriving a third correlation parameter based on a summation of a multiplication of the horizontal and vertical gradients at each prediction sample in the video block;
      deriving a first and second quadratic parameters based on a summation of a squared horizontal gradient at each prediction sample in the video block, and a summation of a squared vertical gradient at each prediction sample in the video block, respectively;
      deriving a first numerator as the difference between a multiplication of the first correlation parameter and the second quadratic parameter, and a multiplication of the second correlation parameter and the third correlation parameter;
      deriving a first denominator as the difference between a multiplication of a squared first parameter and a squared second parameter, and a squared third correlation parameter;
      deriving a second numerator as the difference between a multiplication of the second correlation parameter and the first quadratic parameter, and a multiplication of the first correlation parameter and the third correlation parameter;
      deriving a second denominator as the difference between a multiplication of the squared first parameter and the squared second parameter, and the squared third correlation parameter;
      obtaining the horizontal motion refinement based on a ratio of the first numerator to the first denominator; and
      obtaining the vertical motion refinement based on a ratio of the second numerator to the second denominator.

8. The computing device of claim 7, wherein determining the target MV by iteratively deriving motion refinements for a MV of the video block based on gradients of prediction samples in the video block using the first prediction signal as an initial prediction signal and using the first MV as an initial MV comprises:
  deriving motion refinements based on gradients of prediction samples in the first prediction signal;
  obtaining an updated MV by adding the motion refinements to the first MV of the video block;
  deriving, in response to determining that a stop condition is not satisfied, an updated prediction signal based on the updated MV, setting the updated prediction signal as the first prediction signal, setting the updated MV as the first MV and deriving the motion refinements based on the gradients of the prediction samples in the first prediction signal; and
  terminating, in response to determining that a stop condition is satisfied, the gradient-based motion refinement algorithm, and determining the updated MV as the target MV.

9. The computing device of claim 8, wherein the stop condition is based on magnitudes of horizontal and vertical gradients being equal to or smaller than a first preset value.

10. The computing device of claim 8, wherein the stop condition is based on a number of gradient-based motion refinements being iterated reaching a second preset value.

11. The computing device of claim 7, wherein identifying the target MV by applying the gradient-based motion refinement algorithm in the recursive manner using the first prediction signal and the first MV comprises:
  obtaining a first target MV based on the gradient-based motion refinement algorithm;

obtaining a second target MV based on a block-matching motion estimation algorithm; and selecting the target MV of the video block from the first target MV and the second target MV.

12. The computing device of claim 11, wherein selecting the target MV of the video block from the first target MV and the second target MV comprises:

calculating a rate-distortion (R-D) cost associated with the first target MV;

calculating a R-D cost of the second target MV;

selecting the first target MV based on that the R-D cost of the first MV is less than the R-D cost of the second MV; and selecting the second target MV based on that the R-D cost of the second MV is less than the R-D cost of the first MV.

13. A non-transitory computer-readable storage medium storing a plurality of programs for execution by a computing device having one or more processors, wherein the plurality of programs, when executed by the one or more processors, cause the computing device to perform operations to generate a video bitstream, wherein the operations comprising:

obtaining a first motion vector (MV) associated with a video block obtained from the video;

deriving a first prediction signal of the video block using the first MV;

identifying a target MV by applying a gradient-based motion refinement algorithm in a recursive manner using the first prediction signal and the first MV; and obtaining a second prediction signal of the video block based on the target MV, wherein identifying the target MV by applying the gradient-based motion refinement algorithm in the recursive manner using the first prediction signal and the first MV comprises:

determining the target MV by iteratively deriving motion refinements for a MV of the video block based on gradients of prediction samples in the video block using the first prediction signal as an initial prediction signal and using the first MV as an initial MV, wherein the motion refinements comprise a horizontal motion refinement and a vertical motion refinement, wherein the gradients of the prediction samples comprise sample differences between a prediction sample and corresponding original sample, and a horizontal gradient and a vertical gradient of the prediction sample, and wherein deriving the motion refinements for the MV of the video block based on the gradients of the prediction samples in the video block comprises:

deriving a first correlation parameter based on a summation of a multiplication of the sample difference and the horizontal gradient at each prediction sample in the video block;

deriving a second correlation parameter based on a summation of a multiplication of the sample difference and the vertical gradient at each prediction sample in the video block;

deriving a third correlation parameter based on a summation of a multiplication of the horizontal and vertical gradients at each prediction sample in the video block;

deriving a first and second quadratic parameters based on a summation of a squared horizontal gradient at each prediction sample in the video block, and a summation of a squared vertical gradient at each prediction sample in the video block, respectively;

deriving a first numerator as the difference between a multiplication of the first correlation parameter and the second quadratic parameter, and a multiplication of the second correlation parameter and the third correlation parameter;

deriving a first denominator as the difference between a multiplication of a squared first parameter and a squared second parameter, and a squared third correlation parameter;

deriving a second numerator as the difference between a multiplication of the second correlation parameter and the first quadratic parameter, and a multiplication of the first correlation parameter and the third correlation parameter;

deriving a second denominator as the difference between a multiplication of the squared first parameter and the squared second parameter, and the squared third correlation parameter;

obtaining the horizontal motion refinement based on a ratio of the first numerator to the first denominator; and obtaining the vertical motion refinement based on a ratio of the second numerator to the second denominator.

* * * * *